United States Patent [19]

Summer

[11] Patent Number: 5,282,122
[45] Date of Patent: Jan. 25, 1994

[54] HIGH VOLTAGE POWER SUPPLY TOPOLOGY SUITED FOR MINIATURIZATION

[75] Inventor: Steven E. Summer, Setauket, N.Y.
[73] Assignee: Modular Devices, Inc., Shirley, N.Y.
[21] Appl. No.: 924,562
[22] Filed: Aug. 3, 1992
[51] Int. Cl.5 .......................................... H02M 3/335
[52] U.S. Cl. ...................................... 363/21; 363/25; 363/60; 363/133
[58] Field of Search ............................ 363/15-17, 363/20, 21, 59, 60, 65, 24, 25, 132, 133

[56] References Cited

U.S. PATENT DOCUMENTS

| | | | |
|---|---|---|---|
| 4,210,858 | 7/1980 | Ford et al. | 363/24 X |
| 4,524,411 | 6/1985 | Willis | 363/21 |
| 4,586,119 | 4/1986 | Sutton | 363/17 |
| 4,881,014 | 11/1989 | Okochi | 363/21 |
| 5,144,547 | 9/1992 | Masamoto | 363/20 X |
| 5,162,663 | 11/1992 | Combs et al. | 363/21 |

Primary Examiner—Steven L. Stephan
Assistant Examiner—Adolf Berhane
Attorney, Agent, or Firm—Stephen E. Feldman

[57] ABSTRACT

A high voltage power supply having a low voltage input comprising a transformer having a primary winding, an input switching means coupled to the primary, first and second groups of secondary windings each of which are sub-divided into a plurality of component windings, and voltage converters coupled to each of the component windings for producing series output voltages of opposite polarities across the groups of secondary windings. First and second output switching means alternately switch the series output voltages to provide an intermediate voltage at a common point which is the input of a diode capacitor multiplier circuit thereby producing at its output a high voltage output.

11 Claims, 1 Drawing Sheet

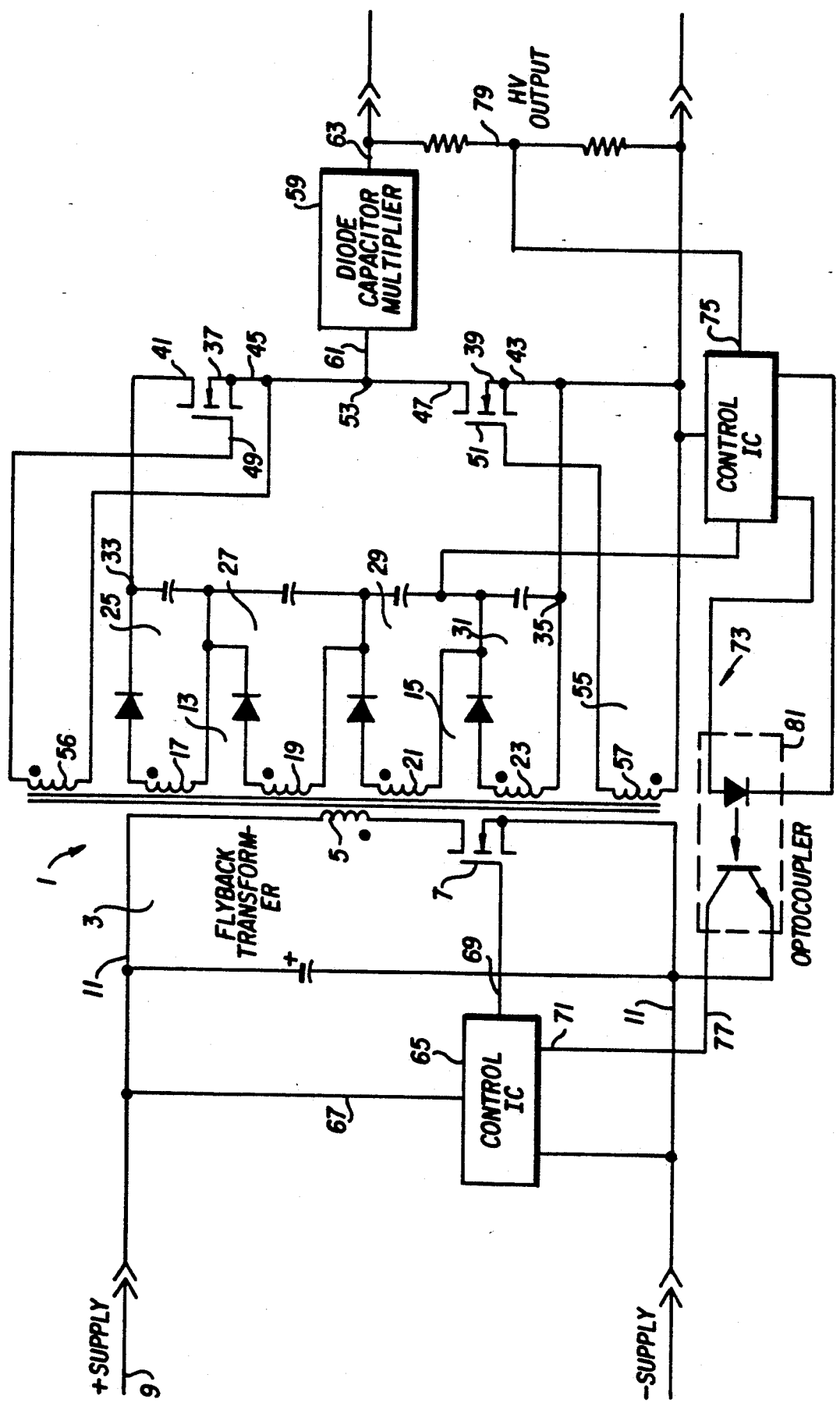

5,282,122

HIGH VOLTAGE POWER SUPPLY TOPOLOGY SUITED FOR MINIATURIZATION

FIELD OF THE INVENTION

This invention relates to a power supply for producing a high voltage output from a low voltage source with relatively small physical size.

BACKGROUND OF THE INVENTION

There is considerable practical difficulty in producing high voltage outputs, in the range of 1,000 to 20,000 volts D.C., from low voltage input sources, in the range of 10 to 28 volts D.C., with small physical size. It is recognized that when the components of a power supply are closely spaced it becomes quite difficult to control breakdown voltages across small physical sizes. Small size can be obtained by using relatively high switching frequencies. The later approach requires large step up ratios in the power supply transformer. For example, in order to construct a power supply with a 10 volts D.C. input and a 3,000 volts D.C., a transformer having a turns ratio of approximately 300:1 might be required. However, a small power transformer with a high turns ratio tends to have large parasitic inductances and capacitances. A large portion of the power into such a transformer goes into energy stored in these parasitic components. Driving such a transformer with a rectangular waveform tends to produce a rounded or sinusoidal output voltage. Although it is possible to work around such resonant effects, the result is that the power transformer is physically larger than it would be otherwise, since it is storing considerable energy in the parasitic components.

With the present invention, the parasitic effects are decreased thereby allowing the construction of compact high voltage power supplies.

OBJECTS OF THE INVENTION

A principal object of the invention is to provide a high voltage power supply topologically suited for miniaturization.

Another object of the invention is to provide a compact high voltage power supply having reduced parasitic effects.

A further object of the invention is to provide a compact high voltage power supply using a flyback power transformer with a relatively low turns ratio.

BRIEF DESCRIPTION OF THE DRAWING

These and other objects and advantages of the invention will be apparent upon reading the following description in conjunction with the drawing, the single figure of which is a partial schematic diagram of a circuit for producing high voltage output from a low voltage input constructed in accordance with the invention.

DESCRIPTION OF THE PREFERRED EMBODIMENT

Referring to the drawing, a circuit for producing a high voltage output from a low voltage input is generally designated by the reference character 1. A flyback type transformer 3 is poled as indicated and has a primary winding 5 connected in series to an input switching means 7, such as a conventional FET, to a low voltage input supply 9 through leads or coupling means 11. The input switching means 7 when energized permits current to flow from said input supply 9 through said primary winding 5 and said input switching means 7. The transformer 3 also includes a first and second group of secondary windings 13 and 15 respectively. The first and second group of secondary windings 13 and 15 respectively are sub-divided into a plurality of component windings (only four of which are shown) 17 and 19, and 21 and 23 respectively. Voltage converter means 25, 27, 29, and 31, each of which comprise a diode and capacitor, are coupled across each of said plurality of component windings 17 and 19, and 21 and 23. The output voltages produced across the capacitor of the first group of voltage converter means 25 and 27 are of the same polarity and in series with each other at a first series output terminal 33. Similarly, the output voltages produced across the capacitor of the second group of voltage converter means 29 and 31 are of the same polarity and in series with each other at a second series output terminal 35 but of opposite polarity to the voltage produced at the first series output terminal 33. First and second output switching means 37 and 39, such as conventional FETs, each having input or source terminals 41 and 43, respectively, output or drain terminals 45 and 47, respectively, and control or gate terminals 49 and 51, respectively, have their output terminals 45 and 47 coupled together at a common connection point or terminal 53, and their input terminals 41 and 43 are coupled to output terminals 33 and 35 respectively. Control means in the form of an additional third group of driving secondary windings 55 from the transformer 3 are sub-divided into first and second component or driving windings, 56 and 57 respectively, are coupled to the first and second output switching means or FETs 37 and 39 respectively, and control the state of the switching means 37 and 39 and are driven so that the gate terminals 49 and 51 are out of phase from one another whereby one switching means is ON while the other is OFF. A voltage multiplier means 59 having an input terminal 61, which is coupled to said common connection points 53, and an output terminals 63 where the high voltage of the circuit 1 is developed. A conventional pulse width modulation or control circuit 65 having an input, output and control terminals, 67, 69 and 71 respectively, has its input terminal 67 coupled to the low input voltage source 9 and has its output terminal 69 coupled to the input or gate terminal of said input switching means or FET 7. An output voltage regulating means 73 having an input and output terminal 75 and 77 respectively, is coupled at its input terminal 75 to the output terminal 63 of the voltage multiplier means 59, and its output terminal 77 is coupled to the control terminal 71 of the pulse width control circuit 65.

The voltage multiplier means 59 comprises a conventional diode capacitor multiplier and the voltage regulating means 73 includes a resistive voltage divider 79 and an optocoupling means 81. The input switching means 7 is connected in series with the primary winding 5 and comprises a conventional FET having a gate terminal which is connected to the output terminal 69 of the pulse width control circuit 65. The voltage converter means 25, 27 and 29, 31 form adjacent sides or legs of a full bridge circuit and the output switching means 37 and 39 form the opposing adjacent sides or legs of the bridge circuit.

In operation a low voltage supply 9, such as 10 volts D.C., is applied across the pulse width modulation circuit 65 which has its output 69 coupled to the gate of FET 7 and drives it at a high frequency, such as 200 kHz. The FET 7 operates as a power switch and when in the conducting or ON state permits current to flow through the primary winding 5 of the flyback power transformer 3 from the input supply 9. Since the power transformer 3 operates in the flyback mode, energy is put into the primary 5 of the transformer 3 when the FET 7 is ON, and released from the secondaries 17, 19, 21, 23, 56 and 57 when the FET 7 is OFF. In the preferred embodiment the flyback transformer 3 is constructed with a total of six isolated component windings for the first and second group of secondary winding 13 and 15, although for simplicity only four component windings 17, 19, 21 and 23 are shown. Each of these component windings have a 5:1 step up from the primary 5. Each of the component windings 17, 19, 21 and 23 are rectified by the diode and peak filtered by the capacitor of each of the six voltage converters 25, 27, 29 and 31, although again for simplicity only four are shown. The rectified outputs of each group of secondary windings 13 and 15 are then connected in series producing an intermediate voltage, 150 volts D.C., across each group (3×5×10) or a total of 300 volts D.C. This first stage of conversion involves a 30:1 ratio. However, as noted above, the flyback transformer 3 does not have a 30:1 turn ratio. Utilization of six isolated secondaries, each secondary winding having a 5:1 step up turn ratio from the primary 5, reduces the parasitic effects by a factor of 36 as compared to a single series connected secondary having such a 30:1 turns ratio. An additional benefit is that the voltage stress on the output rectifiers of the voltage converters is reduced in two ways; firstly by the reduced voltage due to the use of lower turn ratios; secondly by reduced voltages due to lower parasitic components that would otherwise generate overshoot waveforms. These benefits would not be achieved if the six sets of component secondary windings were just connected in series prior to rectification.

The second stage uses the intermediate voltage, 300 volts D.C., developed by the first stage across output terminals 33 and 35 to generate a rectangular waveform having a high frequency. This is accomplished by utilization of a FET half bridge circuit using two FETs 37, 39 which are driven out of phase from each other using additional secondary windings or driving windings 56, 57 from the flyback transformer 3. Accordingly when the upper FET 37 is driven ON the rectified output of the first group of secondary windings 13 appear at the input terminal 53 of the multiplier 59; when the lower FET 39 is subsequently driven ON the rectified output of the second group of secondary windings 15 also appear at the input terminal 53. The resulting high frequency rectangular high voltage waveform at the input 53 of the voltage multiplier 59 drives it, and through the use of a 10 times multiplier string therein, the resulting output at the output terminal 63 is a D.C. voltage in the 3,000 volt range. Through the use of the FET half bridge input, it provides a low impedance drive for the multiplier 59, thereby improving its load regulation.

Regulation of the output voltage at terminal 63 is achieved by the use of a resistive output voltage divider 79 which samples the output voltage and feeds the sampled voltage through a feedback loop back to the pulse width modulation circuit 65. This circuit adjusts the flyback duty cycle to thereby maintain a constant output voltage at terminal 63 regardless of variations in the magnitude of the input supply voltage 9 and output load. Galvanic isolation in the feedback loop and between the input and output is achieved by conventionally comparing the sampled output voltage to a reference voltage and then generating an error signal which is coupled through the optocoupler 81 to the control terminal of the pulse width control circuit 65 which in turn controls the flyback duty cycle.

The invention has been described in detail with particular reference to the single embodiment thereof, but it will be understood that variations and modifications can be effected within the spirit and scope of the invention.

What is claimed is:

1. A circuit for producing a high voltage output from a low voltage input, comprising:
   a transformer having a primary winding;
   an input switching means;
   coupling means for coupling said low voltage input to said primary winding, said input switching means coupled to said primary winding for permitting current to flow through said primary winding;
   said transformer also having a first and second group of secondary windings, each of said first and second groups of secondary windings having at least one component winding;
   voltage converter means coupled to each of said component winding of each of said first and second groups of secondary windings for providing a plurality of output voltages of the same polarity in series with each other at a first and a second series output terminal of opposite polarities and across each of said respective first and second groups of secondary windings;
   first and second output switching means, each of said output switching means having input, output, and control terminals, said outputs of said output switching means coupled together at a common connection point, said input of each of said first and second output switching means coupled to respective first and second series output terminals;
   control means coupled to said first and second output switching means for driving the control terminals of said switching means out of phase from one another; and
   voltage multiplier means having an input terminal coupled to said common connection point and an output terminal at which said high voltage is produced.

2. The circuit as recited in claim 1, further comprising a pulse width control circuit having input, output and control terminals, said input terminal coupled to said low voltage input and said output terminal coupled to said input switching means.

3. The circuit as recited in claim 1, wherein said input switching means provides a flyback mode of operation for said transformer.

4. The circuit as recited in claim 2, further comprising output voltage regulating means having input and output terminals, said input terminal coupled to the output terminal of said voltage multiplier means, said output terminal coupled to the control terminal of said pulse width control circuit.

5. The circuit as recited in claim 1, wherein said voltage multiplier means comprises a diode capacitor multiplier.

6. The circuit as recited in claim 1, wherein said transformer further comprises a third group of secondary windings sub-divided into a first and second component windings, said first and second component windings coupled to respective first and second output switching means.

7. The circuit as recited in claim 4, wherein said output voltage regulating means comprises an optocoupling means.

8. The circuit as recited in claim 1, wherein said input switching means is coupled in series with said primary winding of said transformer.

9. The circuit as recited in claim 1, wherein said voltage converter means and output switching means form a full bridge circuit.

10. The circuit as recited in claim 2, wherein said input switching means provides a flyback mode of operation for said transformer, said voltage multiplier means comprises a diode capacitor multiplier, said transformer further comprises a third group of secondary windings sub-divided into a first and second component windings coupled to respective first and second output switching mean, and wherein said input switching means is coupled in series with said primary winding of said transformer, and wherein said voltage converter means and said output switching means form a full bridge circuit.

11. The circuit as recited in claim 1, wherein each of said first and second groups of secondary windings being sub-divided into a plurality of components windings.

* * * * *